United States Patent [19]
Ball

[11] 3,773,088
[45] Nov. 20, 1973

[54] HOSE PIPES
[75] Inventor: Eric Ball, Birmingham, England
[73] Assignee: Dunlop Holdings Limited, London, England
[22] Filed: May 17, 1971
[21] Appl. No.: 143,991

[30] Foreign Application Priority Data
May 21, 1970  Great Britain.................. 24,695/70

[52] U.S. Cl.............................. 138/129, 138/137
[51] Int. Cl............................................ F16l 11/04
[58] Field of Search.................... 138/129, 132, 137, 138/141

[56] References Cited
UNITED STATES PATENTS
| | | |
|---|---|---|
| 2,974,684 | 3/1961 | Ginanen........................ 138/141 X |
| 2,210,833 | 8/1940 | Clough........................... 138/141 X |
| 693,916 | 2/1902 | Speer................................... 138/132 |
| 3,093,162 | 6/1963 | Reiling........................... 138/129 X |
| 3,581,778 | 6/1971 | Korejwa.......................... 138/137 X |
| 3,578,028 | 5/1971 | Roberts........................... 138/134 X |

*Primary Examiner*—Herbert F. Ross
*Attorney*—Stevens, Davis, Miller & Mosher

[57] ABSTRACT

A hose pipe having a reinforcing layer formed from a reinforcing strip of slit or otherwise perforated film of polymeric material and an adjacent layer of polymeric material arranged to penetrate into the slits or perforations of the reinforcing strip, the polymeric material of the reinforcing layer having a high tenacity compared with that of the polymeric material of the adjacent layer, of which the following is a specification.

10 Claims, 3 Drawing Figures

Patented Nov. 20, 1973

3,773,088

HOSE PIPES

This invention relates to hose pipes and in particular to hose pipes which contain a reinforcing layer of polymeric material.

Hose pipes suitable for industrial purposes normally comprise a reinforced body of rubber or thermoplastics material. It has long been known to use woven fabric or braided yarns to provide the reinforcement and in the assignee's U.K. Pat. No. 1,033,547 we have described a hose in which the reinforcement consists of helically wound strips of rubber containing spaced longitudinally extending reinforcing filaments.

In addition, the specification of assignee's co-pending Patent Application Ser. No. 108,728 of Jan. 22, 1971 describes a hose in which the reinforcement comprises a layer of reinforcement members and a layer of non-woven filamentary material to support the reinforcement members.

It is one object of the present invention to provide a hose pipe having an improved reinforcing layer.

According to one aspect of the invention a hose pipe comprises a reinforcing layer formed from a reinforcing strip of slit or otherwise perforated film of polymeric material and an adjacent layer of polymeric material arranged to penetrate into the slits or perforations of the reinforcing strip, the polymeric material of the reinforcing layer having a high tenacity compared with that of the polymeric material of the adjacent layer.

In this specification the term "tenacity" refers to the ultimate tensile strength of a material.

Preferably the reinforcing strip is in the form of a slit film in which longitudinal slits sub-divide the film into a number of parallel longitudinally extending strands. The strands may be joined at intervals by narrow transverse webs, with the webs between adjacent strands preferably arranged staggered in relation to one another.

According to another aspect of the invention a method of manufacture of a hose pipe comprises forming a reinforcing layer by helically winding a reinforcing strip of a slit or otherwise perforated film of polymeric material, and bonding the reinforcing layer to an adjacent layer of polymeric material of a low tenacity compared with that of the polymeric material of the reinforcing layer.

According to a further aspect of the invention a method of manufacture of a hose pipe comprises helically winding onto a mandrel a reinforcing strip of slit or otherwise perforated film of polymeric material coated with a layer of polymeric material of a low tenacity compared with that of the material of the reinforcing strip, and bonding together adjacent edges of the helically wound reinforcing strip.

Two embodiments of the invention will now be described by way of example with reference to the accompanying drawings in which.

Figure 1:
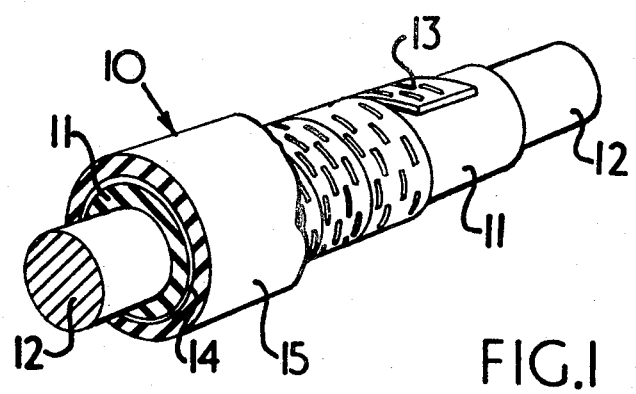
FIG. 1 is a perspective view (not to scale) showing the arrangement of a reinforcng strip in one form of reinforced hose pipe.
Figure 2:
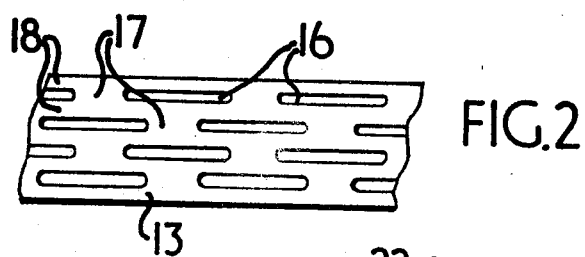
FIG. 2 is a plan view of a reinforcing strip of longitudinally slit film.

In a first embodiment of the invention, illustrated in FIG. 1 and FIG. 2, a reinforced hose pipe 10 is manufactured by extruding a tubular lining layer 11 of unvolcanised rubber onto a steel mandrel 12 and then helically winding onto the lining layer a reinforcing strip 13 of longitudinally slit film so as to form a reinforcing layer 14. Subsequently a cover layer 15 of unvulcanised rubber is extruded over the reinforcing layer and the assembly is then heated to vulcanise the rubber.

In the assembled hose the rubber material of the lining layer 11 interconnects through the longitudinal slits 16 with the rubber material of the cover layer 15, the layer 14 of slit film thereby being held firmly in position so as to act effectively as a reinforcement layer of the hose pipe.

To form a balanced hose pipe of a kind which is normally required to retain internal pressure forces, the method described above may be employed, with the exception that one or more pairs of layers of reinforcement are applied to the lining layer. In this arrangement each reinforcing layer is formed from a helically wound strip of slit film, the reinforcing layers of each pair of layers being separated from each other by a layer of rubber and the reinforcing strip of one layer being wound in an opposite sense to the reinforcing strip of the other layer of the pair.

The longitudinally slit film may be formed, for example, from a polyamide material such as nylon, or a polyester or polypropylene material and the lining and cover layers of the hose pipe may be formed from rubber as described above, or alternatively from a thermoplastic material. Preferably the material of the slit film is a high tenacity material having a breaking load in the order of 8 grams per denier. The transverse web portions 17 which join the longitudinally extending strands 18 of the slit film are preferably arranged in staggered relation to one another.

In an alternative construction a lining layer or cover layer may be omitted. Thus a hose with a single layer or reinforcement would simply comprise a layer of helically wound longitudinally slit film and a surface layer of rubber or thermoplastics material adjacent the reinforcing layer.

In such a configuration, having only one surface layer, the material extending from the surface layer into the longitudinal slits does not interconnect with the material of a second surface layer on the other side of the slit film and hence the mechanical interlocking between the surface layer and reinforcing layer is less positive than in the arrangement where a pair of surface layers interconnect.

It may, therefore, be necessary to provide additional bonding between the surface layer and the reinforcing layer and in the case of a surface layer formed from calendered natural or synthetic rubber this bonding may be achieved by the incorporation of a resorcinal/formaldehyde/silica bonding system into the rubber at the original mixing stage. Alternatively, and in particular where the surface layer is formed from thermoplastics material, bonding may be achieved by the use of a suitable adhesive applied to the slit film.

Figure 3:
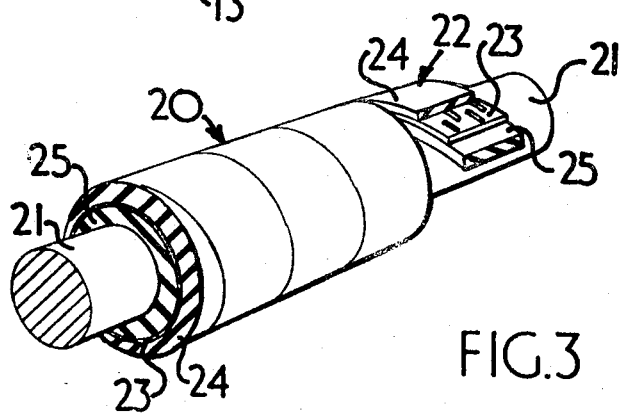
FIG. 3 is a perspective view showing the arrangement of wound strips in another form of reinforced hose pipe.

In a second embodiment of the invention, illustrated in FIG. 3, a hose pipe 20 is manufactured by helically winding onto a mandrel 21 a composite reinforcing strip 22 comprising a strip of longitudinally slit film 23 covered on each side with a calendered layer 24, 25 of rubber. The two layers 24, 25 of rubber interconnect through the slit film so that in the final vulcanised hose assembly the reinforcing layer of slit film is firmly held between the layers of rubber in a similar manner to a hose constructed in accordance with the first embodiment of the invention.

This method may also be used to form a balanced hose pipe. In this case one reinforcing layer is formed by helically winding onto a mandrel a strip of slit film having a layer of calendered rubber applied to each side, and a second reinforcing layer is formed by winding onto the mandrel and first reinforcing strip, in an opposite sense thereto, a second reinforcing layer comprising a strip of slit film having a layer of calendered rubber applied to only one side to form a cover layer of the hose pipe.

In respect of the first reinforcing layer, the two layers of rubber interconnect through the strip of slit film to firmly hold the slit film in a similar manner to the hose construction described in respect of the first embodiment of the invention. Preferably, however, the rubber layers are calendered directly onto the slit film at a calender to ensure cleanliness of surface contact with the slit film by the presentation of nascent surfaces.

However, in the case of the strip material of the second reinforcing layer which comprises only one surface layer of rubber it is necessary to provide bonding between the slit film and the layer of rubber. The bonding may be achieved by applying a suitable adhesive to the slit film, by incorporating a tack promoter in the rubber, or by simple mechanical interlocking.

In another arrangement a slit or otherwise perforated film may be applied to a layer or strip of polymer impregnated non-woven filamentary material of the kind described in the specification of our co-pending U.K. Pat. application No. 3,686/70 and 24,693/70. Where, for example, the hose pipe is constructed by helically winding a strip of rubber coated slit or perforated film, the non-woven filamentary material may be incorporated within the strips, whilst where the hose pipe is constructed by helically winding a strip of non-coated slit or perforated film onto a layer of polymeric material, the non-woven filamentary material may be incorporated within the layer of polymeric material.

In a further arrangement the reinforcing strip may be formed from a layer of slit or perforated film having at least one adjacent layer of elastomeric, thermoplastic, or other polymeric material applied in the form of a latex or a solution before or during the manufacture of the hose.

In a hose pipe according to the present invention the slit or perforated film replaces the textile yarn used in conventional hoses made by helical lapping, braiding, or employing woven or knitted fabric as a reinforcement. Thus an economic advantage is obtained by the present invention since slit or perforated film is cheaper to produce than multi-filament or monofilament yarn.

Having now described my invention - what I claim is:

1. A hose pipe comprising a reinforcing layer formed from a reinforcing strip of slit or otherwise perforated flexible film of polymeric material and an adjacent layer of polymeric material arranged to penetrate into the slits or perforations of the reinforcing strip, the polymeric material of the reinforcing layer having a high tenacity compared with that of the polymeric material of the adjacent layer.

2. A hose pipe according to claim 1 wherein the reinforcing layer is formed from a helically wound reinforcing strip of longitudinally slit film of polymeric material.

3. A hose pipe according to claim 1 wherein a layer of polymeric material is arranged adjacent each surface of the reinforcing layer, the said layrs adjacent the reinforcing layer interconnecting with each other through the slits in the reinforcing layer.

4. A hose pipe according to claim 1 wherein the film is provided with slits arranged so that the film takes the form substantially of a plurality of longitudinally extending strands.

5. A hose pipe according to claim 4 wherein the longitudinally extending strands are joined by transverse webs.

6. A hose pipe according to claim 5 wherein the webs between adjacent strands are staggered relative to one another.

7. A hose pipe according to claim 1 wherein an adjacent layer of polymeric material forms a cover layer of the hose pipe.

8. A hose pipe according to claim 1 wherein an adjacent layer of polymeric material forms a lining layer of the hose.

9. A hose pipe according to claim 1 wherein the polymeric material of the adjacent layer is natural or synthetic rubber.

10. A hose pipe according to claim 1 wherein the polymeric material of the adjacent layer is a thermoplastics material.

* * * * *